United States Patent
Han et al.

(10) Patent No.: US 10,836,891 B2
(45) Date of Patent: Nov. 17, 2020

(54) ETHYLENE/ALPHA-OLEFIN/DIENE INTERPOLYMERS COMPOSITIONS

(71) Applicant: Dow Global Technologies LLC, Midland, MI (US)

(72) Inventors: Tao Han, Shanghai (CN); Colin LiPiShan, Pearland, TX (US); Isao Hattori, Tokyo (JP)

(*) Notice: Subject to any disclaimer, the term of this patent is extended or adjusted under 35 U.S.C. 154(b) by 48 days.

(21) Appl. No.: 16/306,123

(22) PCT Filed: May 30, 2017

(86) PCT No.: PCT/US2017/035020
§ 371 (c)(1),
(2) Date: Nov. 30, 2018

(87) PCT Pub. No.: WO2017/210201
PCT Pub. Date: Dec. 7, 2017

(65) Prior Publication Data
US 2019/0136030 A1    May 9, 2019

(30) Foreign Application Priority Data
May 30, 2016 (WO) ............... PCT/CN2016/083876

(51) Int. Cl.
| | | |
|---|---|---|
| C08F 210/06 | (2006.01) | |
| C08L 23/16 | (2006.01) | |
| C08K 3/04 | (2006.01) | |
| C08K 5/01 | (2006.01) | |
| C08J 9/10 | (2006.01) | |
| C08F 4/659 | (2006.01) | |
| C08K 3/26 | (2006.01) | |

(52) U.S. Cl.
CPC ............. C08L 23/16 (2013.01); C08J 9/105 (2013.01); C08K 3/04 (2013.01); C08K 5/01 (2013.01); C08F 4/65908 (2013.01); C08J 2203/04 (2013.01); C08J 2205/052 (2013.01); C08K 2003/265 (2013.01); C08L 2203/14 (2013.01); C08L 2205/025 (2013.01); C08L 2205/03 (2013.01)

(58) Field of Classification Search
CPC .. C08L 23/16; C08L 2203/14; C08L 2205/03; C08L 2205/025; C08J 9/105; C08J 2205/052; C08J 2203/04; C08K 5/01; C08K 3/04; C08K 2003/265; C08F 210/16; C08F 4/64193; C08F 4/65908; C08F 210/06; C08F 236/20; C08F 2500/17
See application file for complete search history.

(56) References Cited

U.S. PATENT DOCUMENTS

| | | |
|---|---|---|
| 919,988 A | 4/1909 | Witzal |
| 5,677,382 A | 10/1997 | Tsuji et al. |
| 5,691,413 A | 11/1997 | Morikawa et al. |
| 5,973,017 A | 10/1999 | Okita et al. |
| 5,977,251 A | 11/1999 | Kao et al. |
| 6,545,088 B1 | 4/2003 | Kolthammer et al. |
| 8,299,189 B2 | 10/2012 | Boone et al. |
| 8,354,484 B2 | 1/2013 | Konze et al. |
| 8,450,438 B2 | 5/2013 | Aboelella et al. |
| 9,422,383 B2 | 8/2016 | LiPiShan et al. |
| 10,160,819 B2 | 12/2018 | LiPiShan et al. |
| 10,160,841 B2 | 12/2018 | LiPiShan et al. |
| 2011/0034577 A1 | 2/2011 | Peng et al. |
| 2011/0160323 A1 | 6/2011 | Liang et al. |
| 2012/0059123 A1 | 3/2012 | Nakano |
| 2012/0116021 A1 | 5/2012 | Liang et al. |
| 2014/0336290 A1 | 11/2014 | Jourdain |
| 2014/0378602 A1* | 12/2014 | Walther et al. ...... C08L 23/0815 524/526 |
| 2015/0259491 A1 | 9/2015 | LiPiShan et al. |
| 2015/0274867 A1 | 10/2015 | LiPiShan et al. |
| 2017/0101493 A1 | 4/2017 | Fontaine et al. |
| 2017/0101494 A1 | 4/2017 | Fontaine et al. |
| 2017/0101495 A1 | 4/2017 | Kapur et al. |

FOREIGN PATENT DOCUMENTS

JP     3582176 B2    10/2004

OTHER PUBLICATIONS

Williams and Ward, J. Polym. Sci., Polym. Letters, 6, 621-624 (1968).
PCT/CN2016/083876, International Search Report and Written Opinion dated Mar. 7, 2017.
PCT/US2017/035020, International Search Report and Written Opinion dated Aug. 17, 2017.
PCT/US2017/035020, International Preliminary Report on Patentability dated Dec. 4, 2018.

* cited by examiner

Primary Examiner — Nathan M Nutter

(57) ABSTRACT

The invention provides a composition comprising at least one oil, and a first composition comprising the following: A) a first composition A comprising an ethylene/α-olefin/non-conjugated diene interpolymer A, B) an ethylene/α-olefin/non-conjugated diene interpolymer B; and wherein the weight ratio of component A to component B is from 1/1 to 20/1; wherein the Mw of the ethylene/α-olefin/non-conjugated diene B is greater than the Mw of the first composition A; and wherein the composition has a Mooney Viscosity (ML1+4, 100 C) from 20 to 100.

16 Claims, 1 Drawing Sheet

ETHYLENE/ALPHA-OLEFIN/DIENE INTERPOLYMERS COMPOSITIONS

REFERENCE TO RELATED APPLICATIONS

This application claims the benefit of International Application PCT/CN16/083876, filed May 30, 2016, and incorporated herein by reference.

BACKGROUND

This invention relates to rubber compositions for producing foamed sponge profiles which contain at least two ethylene/α-olefin/non-conjugated diene interpolymes.

Conventional EPDM-based compositions for foamed applications are described in the following references: U.S. Pat. No. 5,973,017, US20140336290, US20120059123, US20110160323, WO2007/136494, WO2007/136496, WO2007/136497, WO2014/084892, WO2013/096573, WO2014/084893, WO2016/003878, WO2016/003879 and WO2016/003880. However, there is a need for new compositions that have excellent foamability, and which generate excellent foamed products with smooth surface appearance. These needs have been met by the following invention.

SUMMARY OF INVENTION

The invention provides a composition comprising at least one oil, and a first composition comprising the following:

A) a first composition A comprising an ethylene/α-olefin/non-conjugated diene interpolymer A, B) an ethylene/α-olefin/non-conjugated diene interpolymer B; and wherein the weight ratio of component A to component B is from 1/1 to 20/1;

wherein the weight average molecular weight (Mw) of the ethylene/α-olefin/non-conjugated diene B is greater than the weight average molecular weight (Mw) of the first composition A; and wherein the composition has a Mooney Viscosity (ML1+4, 100° C.) from 20 to 100.

DETAILED DESCRIPTION

Figure 1:
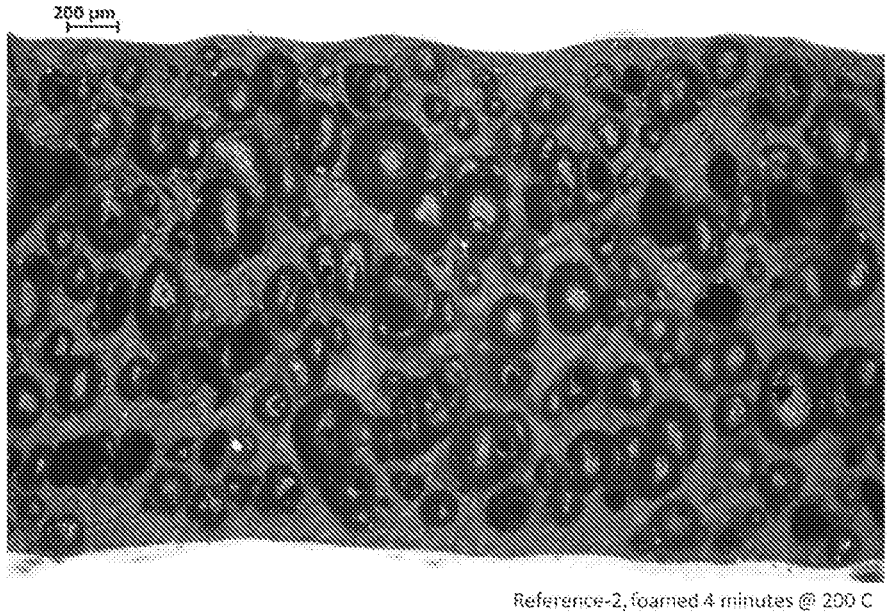
FIG. 1 is an optical micrograph of the morphology of a sponge formed by comparative composition F-b.

It has been discovered that the inventive compositions can be used to form foams with excellent closed cell morphology and nice skin surface. The inventive compositions, containing both First Composition A and EPDM-B, show very high Mooney relaxation area. Higher Mooney relaxation area means the rubber composition has higher melt elasticity, better carbon black incorporation during mixing, improved dimension stability during extrusion, better bubble stability during foaming. All which provide excellent closed cell morphology and nice skin surface.

As discussed above, the invention provides a 1. A composition comprising at least one oil, and a first composition comprising the following:

A) a first composition A comprising an ethylene/α-olefin/non-conjugated diene interpolymer A, B) an ethylene/α-olefin/non-conjugated diene interpolymer B; and wherein the weight ratio of component A to component B is from 1/1 to 20/1;

wherein the Mw of the ethylene/α-olefin/non-conjugated diene B is greater than the Mw of the first composition A; and wherein the composition has a Mooney Viscosity (ML1+4, 100° C.) from 20 to 100.

The inventive composition may comprise a combination of two or more embodiments described herein.

The first composition may comprise a combination of two or more embodiments described herein.

The first composition A may comprise a combination of two or more embodiments described herein. The ethylene/α-olefin/non-conjugated diene A may comprise a combination of two or more embodiments described herein. The ethylene/α-olefin/non-conjugated diene B may comprise a combination of two or more embodiments described herein.

In one embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In one embodiment, the alpha-olefin of interpolymer B is the same alpha-olefin of interpolymer A.

In one embodiment, or in combination with any one or more embodiments described herein, the weight ratio of component A to component B is from 2/1 to 20/1, or from 3/1 to 20/1, of from 4/1 to 20/1, or from 5/1 to 20/1, or from 6/1 to 20/1, of from 7/1 to 20/1, or from 8/1 to 20/1, or from 9/1 to 20/1. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In one embodiment, the alpha-olefin of interpolymer B is the same alpha-olefin of interpolymer A.

In one embodiment, or in combination with any one or more embodiments described herein, the weight ratio of component A to component B is from 1/1 to 19/1, or from 2/1 to 19/1, or from 3/1 to 19/1, of from 4/1 to 19/1, or from 5/1 to 19/1, or from 6/1 to 19/1, of from 7/1 to 19/1, or from 8/1 to 19/1, or from 9/1 to 19/1. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In one embodiment, the alpha-olefin of interpolymer B is the same alpha-olefin of interpolymer A.

In one embodiment, or in combination with any one or more embodiments described herein, the composition has a Mooney Viscosity (ML1+4, 100° C.) from 30 to 80, or from 30 to 75, or from 30 to 65, or from 30 to 60. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In one embodiment, the alpha-olefin of interpolymer B is the same alpha-olefin of interpolymer A.

In one embodiment, or in combination with any one or more embodiments described herein, the composition has a Mooney Viscosity (ML1+4, 100° C.) from 20 to 80, or from 20 to 60, or from 20 to 50, or from 20 to 40. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In one embodiment, the alpha-olefin of interpolymer B is the same alpha-olefin of interpolymer A.

In one embodiment, or in combination with any one or more embodiments described herein, the first composition meets the following Equation A:

$$4.50 < [(Mz/Mn)_{(first\ comp.)}/(TD0.1_{(first\ comp.)})] < 8.00 \quad \text{(Eqn. A)},$$

wherein $TD0.1_{(first\ comp.)}$ is the tan delta of the first composition at 0.1 rad/sec and 190° C. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. Mz, and Mn are determined from conventional GPC. In one embodiment, the alpha-olefin of interpolymer B is the same alpha-olefin of interpolymer A.

In one embodiment, the first composition meets the following Equation A1: $4.60 \leq [(Mz/Mn)_{(first\ comp.)}/(TD0.1_{(first\ comp.)})] \leq 8.00$, or $4.70 \leq [(Mz/Mn)_{(first\ comp.)}/(TD0.1_{(first\ comp.)})] \leq 8.00$, or $4.75 \leq [(Mz/Mn)_{(first\ comp.)}/(TD0.1_{(first\ comp.)})] \leq 8.00$. Tan delta at 190° C. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, or ≥99 wt % of the ethylene/alpha-olefin/non-conjugated diene interpolymer A, based on the weight of the first composition A. Mz, and Mn are determined from conventional GPC. In one embodiment, the alpha-olefin of interpolymer B is the same alpha-olefin of interpolymer A.

In one embodiment, the first composition meets the following Equation B: $[(Mz_{(first\ comp.)})/(TD0.1_{(first\ comp.)})]/(Mw/Mn)_{(first\ comp.)} \geq 100{,}000$ g/mol, or ≥105,000 g/mol, or ≥110,000 g/mol, or ≥115,000 g/mol, or ≥120,000 g/mol, or ≥125,000 g/mol (Eqn. B), where $TD0.1_{(first\ comp.)}$ is the tan delta of the first composition at 0.1 rad/sec and 190° C. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. Mz, Mw and Mn are determined from conventional GPC. In one embodiment, the alpha-olefin of interpolymer B is the same alpha-olefin of interpolymer A.

In one embodiment, the first composition meets the following Equation C: $[(Mz_{(first\ comp.)})/(TD0.1_{(first\ comp.)})]/(Mw/Mn)_{(first\ comp.)} \leq 400{,}000$ g/mol, or ≤350,000 g/mol, or ≤300,000 g/mol, or ≤250,000 g/mol, or ≤200,000 g/mol (Eqn. C), where $TD0.1_{(first\ comp.)}$ is the tan delta of the first composition at 0.1 rad/sec and 190° C. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. Mz, Mw and Mn are determined from conventional GPC. In one embodiment, the alpha-olefin of interpolymer B is the same alpha-olefin of interpolymer A.

In one embodiment, the first composition meets the following Equation D: $(Mz_{(first\ comp.)})/(TD0.1_{(first\ comp.)}) \geq 300{,}000$ g/mol, or ≥320,000 g/mol, or ≥340,000 g/mol, or ≥360,000 g/mol, or ≥380,000 g/mol, or ≥400,000 g/mol (Eqn. D), where $TD0.1_{(first\ comp.)}$ is the tan delta of the first composition at 0.1 rad/sec and 190° C. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. Mz is determined from conventional GPC. In one embodiment, the alpha-olefin of interpolymer B is the same alpha-olefin of interpolymer A.

In one embodiment, the first composition meets the following Equation E: $[(Mz_{(first\ comp.)})/(TD0.1_{(first\ comp.)}) \leq 660{,}000$ g/mol, or ≤640,000 g/mol, or ≤620,000 g/mol, or ≤600,000 g/mol, or ≤580,000 g/mol, or ≤560,000 g/mol (Eqn. E), where $TD0.1_{(first\ comp.)}$ is the tan delta of the first composition A at 0.1 rad/sec and 190° C. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In one embodiment, the alpha-olefin of interpolymer B is the same alpha-olefin of interpolymer A.

In one embodiment, or in combination with any one or more embodiments described herein, the composition comprises ≥30 wt %, or ≥35 wt %, or ≥40 wt %, or ≥45 wt %, or ≥50 wt %, of the oil and the first composition, based on the weight of the composition. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, or ≥99 wt % of the ethylene/alpha-olefin/non-conjugated diene interpolymer A, based on the weight of the first composition A. In one embodiment, the alpha-olefin of interpolymer B is the same alpha-olefin of interpolymer A.

Oils include, but are not limited to, petroleum oils, such as paraffinic, aromatic and naphthenic oils; polyalkylbenzene oils; and organic acid monoesters.

In one embodiment, or in combination with any one or more embodiments described herein, the weight ratio of the first composition to the oil is from 0.8/1 to 1.5/1, or from 0.9/1 to 1.4/1, or from 0.9/1 to 1.3/1. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, or ≥99 wt % of the ethylene/alpha-olefin/non-conjugated diene interpolymer A, based on the weight of the first composition A.

In one embodiment, or in combination with any one or more embodiments described herein, the first composition has V0.1 (at 190° C.) from 140,000 to 420,000, or from 150,000 to 400,000, or from 160,000 to 380,000 Pa·sec. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, or ≥99 wt % of the ethylene/alpha-olefin/non-conjugated diene interpolymer A, based on the weight of the first composition A.

In one embodiment, or in combination with any one or more embodiments described herein, the ethylene/α-olefin/non-conjugated diene interpolymer B has a Mw from 340,000 to 550,000 g/mole, or from 360.000 to 500,000 g/mole, or from 380,000 g/mole to 450,000 g/mole; and wherein the first composition A has a Mw from 150,000 to 320,000 g/mole, or from 180,000 to 310,000 g/mole, or from 200,000 g/mole to 300,000 g/mole. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A.

In one embodiment, or in combination with any one or more embodiments described herein, the composition has a MLRA value≥200, or ≥220. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A.

In one embodiment, or in combination with any one or more embodiments described herein, the ethylene/α-olefin/non-conjugated diene interpolymer A is an EPDM. In a further embodiment, the diene is ENB.

In one embodiment, or in combination with any one or more embodiments described herein, the ethylene/α-olefin/non-conjugated diene interpolymer B is an EPDM. In a further embodiment, the diene is ENB.

In one embodiment, or in combination with any one or more embodiments described herein, component A and component B further differ in one or more of the following properties: Mn, MWD, V0.1, V100, V0.1/V100, density and/or Mooney Viscosity. In a further embodiment, each ethylene/α-olefin/non-conjugated diene interpolymer is an EPDM.

In a further embodiment, the diene is ENB.

In one embodiment, an inventive composition further comprises a thermoplastic polymer. Polymers, include, but not limited to, propylene-based polymers, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene/α-olefin interpolymers, and homogeneously branched substantially linear ethylene/α-olefin interpolymers (that is homogeneously branched long chain branched ethylene/α-olefin interpolymers).

In one embodiment, or in combination with any one or more embodiments described herein, the composition comprises less than 1.0 wt %, further less than 0.5 wt %, further less than 0.1 wt % of a propylene-based polymer, based on the weight of the composition.

In one embodiment, or in combination with any one or more embodiments described herein, the composition does not contain a coupling agent, for example, an azide compound or a peroxide.

An inventive composition may comprise one or more additional additives. Suitable additives include, but are not limited to, fillers, antioxidants, UV stabilizers, flame retardants, colorants or pigments, crosslinking agents, and combinations thereof.

In one embodiment, the composition further comprises a crosslinking agent. Cross-linking agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; and peroxides, such as di-tertbutyl peroxide, tertbutylcumyl peroxide, dicumyl peroxide, 2,5-dimethyl-2,5-di-(tertbutylperoxy) hexane, di-(tertbutyl-peroxyisopropyl) benzene, tertbutyl peroxybenzoate and 1,1-di-(tertbutylperoxy)-3,3,5-tri-methylcyclohexane.

The invention also provides a crosslinked composition formed from an inventive composition of one or more embodiments described herein.

In one embodiment, an inventive composition further comprises a filler. Suitable fillers include, but are not limited to, clay, CaCO3, talc, carbon black, and mineral fibers.

In one embodiment, the composition further comprises a curing package containing sulfur, one or more accelerators, carbon black, zinc oxide, oil, one or more blowing agents, one or more activators, and one or more stabilizers.

Blowing agents can be added to produce sponge products. Different and additional cross-linking agents and activators, accelerators and coagents such as sulfur, sulfur donor, sulphenamide, mercapto, guanidine, carbamate, morpholine, thiazol, sulfonamide, peroxides, multifunctional acrylate, triallylcyanurate can be used.

In one embodiment, the composition comprises greater than, or equal to, 70 weight percent, or greater than, or equal to, 75 weight percent, or greater than, or equal to, 80 weight percent, of the first composition, based on the weight of the composition. In a further embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In one embodiment, the alpha-olefin of interpolymer B is the same alpha-olefin of interpolymer A.

The invention also provides an article comprising at least one component formed from the composition of one embodiment, or a combination of two or more embodiments described herein. In a further embodiment, the article is a foam.

First Composition

In one embodiment, or in combination with any one or more embodiments described herein, the first composition has a weight average molecular weight (Mw) greater than, or equal to, 140,000 g/mole, or greater than, or equal to, 160,000 g/mole, or greater than, or equal to, 180,000 g/mole, or greater than, or equal to, 200,000 g/mole.

In one embodiment, or in combination with any one or more embodiments described herein, the first composition has a weight average molecular weight (Mw) less than, or equal to, 400,000 g/mole, or less than, or equal to, 380,000 g/mole, or less than, or equal to, 350,000 g/mole, or less than, or equal to, 320,000 g/mole.

In one embodiment, or in combination with any one or more embodiments described herein, the first composition has a z average molecular weight (Mz) greater than, or equal to, 400,000 g/mole, or greater than, or equal to, 450,000 g/mole, or greater than, or equal to, 500,000 g/mole, or greater than, or equal to, 540,000 g/mole. In one embodiment, or in combination with any one or more embodiments described herein, the first composition has a z average molecular weight (Mz) less than, or equal to, 750,000 g/mole, or less than, or equal to, 730,000 g/mole, or less than, or equal to, 700,000 g/mole, or less than, or equal to, 680,000 g/mole.

In one embodiment, or in combination with any one or more embodiments described herein, the first composition has a number average molecular weight (Mn) greater than, or equal to, 45,000 g/mole, or greater than, or equal to, 50,000 g/mole, or greater than, or equal to, 55,000 g/mole, or greater than, or equal to, 60,000 g/mole. In one embodiment, or in combination with any one or more embodiments described herein, the first composition has a number average molecular weight (Mn) less than, or equal to, 150,000 g/mole, or less than, or equal to, 120,000 g/mole, or less than, or equal to, 100,000 g/mole, or less than, or equal to, 95,000 g/mole.

In one embodiment, or in combination with any one or more embodiments described herein, the first composition has a MWD less than, or equal to, 4.50, further less than, or equal to, 4.00, further less than, or equal to, 3.50. In one embodiment, or in combination with any one or more embodiments described herein, the first composition has a MWD greater than, or equal to, 2.80, or greater than, or equal to, 3.10, or greater than, or equal to, 3.30.

In one embodiment, or in combination with any one or more embodiments described herein, the first composition has a tan delta (0.1 rad/sec, 190° C.) from 0.90 to 1.80, or from 1.00 to 1.70, or from 1.10 to 1.60.

In one embodiment, or in combination with any one or more embodiments described herein, the first composition has a viscosity at 0.1 rad/sec, 190° C., greater than, or equal to, 120,000 Pa·s, or greater than, or equal to, 140,000 Pa·s, or greater than, or equal to, 160,000 Pa·s. The viscosity at 0.1 rad/sec, 190° C. is that of the composition without filler and without oil. In one embodiment, or in combination with any one or more embodiments described herein, the first composition has a viscosity at 0.1 rad/sec, 190° C., less than, or equal to, 450,000 Pa·s, or less than, or equal to, 400,000 Pa·s, or less than, or equal to, 370,000 Pa·s, or less than, or equal to, 180,000 Pa·s. The viscosity at 0.1 rad/sec, 190° C. is that of the composition without filler and without oil.

In one embodiment, or in combination with any one or more embodiments described herein, the first composition has a rheology ratio (V0.1/V100 at 190° C.) greater than, or equal to, 30, or greater than, or equal to, 35, or greater than, or equal to, 40. Each viscosity is that of the composition without filler and without oil.

In one embodiment, the ratio of the Mw of the first composition to the Mw of the first composition A is from 0.60 to 1.70, or from 0.70 to 1.60, or from 0.80 to 1.50. In a further embodiment, each ethylene/α-olefin/diene interpolymer (is an EPDM. In a further embodiment, the diene is ENB.

In one embodiment, the ratio of the MWD of the first composition to the MWD of the first composition A is from 0.90 to 1.50, or from 0.95 to 1.30, or from 1.00 to 1.10. In a further embodiment, each ethylene/α-olefin/diene interpolymer (is an EPDM. In a further embodiment, the diene is ENB.

In one embodiment, the ratio of the tan delta (0.1 rad/s, 190° C.) of the first composition to the tan delta (0.1 rad/s, 190° C.) of the first composition A is from 0.95 to 1.70, or from 1.00 to 1.60, or from 1.05 to 1.50. In one embodiment, the ratio of the viscosity (0.1 rad/s, 190° C.) of the first composition to the viscosity (0.1 rad/s, 190° C.) of the first composition A is from 1.00 to 2.35, or from 1.05 to 2.30, or from 1.10 to 2.25. In one embodiment, each ethylene/α-olefin/diene interpolymer (is an EPDM. In a further embodiment, the diene is ENB.

In one embodiment, or in combination with any one or more embodiments described herein, the first composition comprises ≥95 wt %, or ≥96 wt % or ≥97 wt %, or ≥98%, or ≥99 wt % of the sum of first composition A and the ethylene/alpha-olefin/non-conjugated diene interpolymer B, based on the weight of the first composition. In a further embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A.

The first composition may comprise a combination of two or more embodiments as described herein.

Ethylene/α-Olefin/Non-Conjugated Polyenes Interpolymers

Each ethylene/α-olefin/non-conjugated diene interpolymer, for the first composition described herein, comprise, independently, in polymerize form, ethylene, an α-olefin, and a non-conjugated diene. Suitable examples of α-olefins include the C3-C20 α-olefins, further C3-C10 α-olefins, and preferably propylene. Suitable examples of non-conjugated polyenes include the C4-C40 non-conjugated dienes. In one embodiment, the alpha-olefin of interpolymer B is the same alpha-olefin of interpolymer A.

For each interpolymer, independently, the α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/diene (EPDM) terpolymer. In a further embodiment, the diene is 5-ethylidene-2-norbornene (ENB). In one embodiment, the alpha-olefin of interpolymer B is the same alpha-olefin of interpolymer A.

For each interpolymer, independently, illustrative non-conjugated dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododeca-diene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a non-conjugated diene selected from the group consisting of ENB, dicyclopentadiene, 1,4-hexadiene, 7-methyl-1,6-octadiene, and preferably, ENB, dicyclo-pentadiene and 1,4-hexadiene, more preferably ENB and dicyclopentadiene, and even more preferably ENB.

In one embodiment, or in combination with any one or more embodiments described herein, the ethylene/α-olefin/non-conjugated diene interpolymer A comprises a majority amount of polymerized ethylene, based on the weight of the interpolymer. In a further embodiment, the interpolymer is an EPDM. In a further embodiment, the diene is ENB.

In one embodiment, or in combination with any one or more embodiments described herein, the ethylene/α-olefin/non-conjugated diene interpolymer B comprises a majority amount of polymerized ethylene, based on the weight of the interpolymer. In a further embodiment, the interpolymer is an EPDM. In a further embodiment, the diene is ENB. In one embodiment, the alpha-olefin of interpolymer B is the same alpha-olefin of interpolymer A.

In one embodiment, or in combination with any one or more embodiments described herein, both ethylene/α-olefin/non-conjugated diene interpolymers A and B, independently, comprise a majority amount of polymerized ethylene, based on the weight of the interpolymer. In a further embodiment, each interpolymer is an EPDM. In a further embodiment, the diene is ENB. In one embodiment, the alpha-olefin of interpolymer B is the same alpha-olefin of interpolymer A.

In one embodiment, or in combination with any one or more embodiments described herein, the ethylene/α-olefin/non-conjugated diene interpolymer A is an EPDM. In a further embodiment, the diene is ENB. In one embodiment, or in combination with any one or more embodiments described herein, the ethylene/α-olefin/non-conjugated diene interpolymer B is an EPDM. In a further embodiment, the diene is ENB. In one embodiment, the alpha-olefin of interpolymer B is the same alpha-olefin of interpolymer A.

In one embodiment, or in combination with any one or more embodiments described herein, the ethylene/α-olefin/non-conjugated diene interpolymers B comprises from 62 to 72 wt % of C2, and from 3.0 to 5.5 wt % ENB.

In one embodiment, or in combination with any one or more embodiments described herein, the ethylene/α-olefin/non-conjugated diene interpolymer B has a molecular weight distribution (Mw/Mn) from 1.80 to 3.50, or from 1.90 to 3.20, or from 2.00 to 3.00, or from 2.00 to 2.80, or from 2.10 to 2.60. In a further embodiment, the interpolymer is an EPDM. In a further embodiment, the diene is ENB.

In one embodiment, or in combination with any one or more embodiments described herein, the ethylene/α-olefin/non-conjugated diene interpolymer B has a Mooney viscosity, ML1+4 at 125° C., greater than, or equal to, 70, further greater than, or equal to, 75, further greater than, or equal to 80. In a further embodiment, the interpolymer is an EPDM. In a further embodiment, the diene is ENB. Mooney viscosity is that of the neat interpolymer. The neat interpolymer refers to the interpolymer without filler and without oil. In one embodiment, or in combination with any one or more embodiments described herein, the ethylene/α-olefin/non-conjugated diene interpolymer B has a Mooney viscosity, ML1+4 at 125° C., less than 180, or less than, or equal to, 170, or less than, or equal to, 160. In a further embodiment, the interpolymer is an EPDM. In a further embodiment, the diene is ENB. Mooney viscosity is that of the neat interpolymer. The neat interpolymer refers to the interpolymer without filler and without oil. In one embodiment, the alpha-olefin of interpolymer B is the same alpha-olefin of interpolymer A.

In one embodiment, or in combination with any one or more embodiments described herein, the ethylene/α-olefin/non-conjugated diene interpolymer B has density from 0.850 to 0.890 g/cc, or from 0.852 to 0.880 g/cc, or from 0.855 to 0.870 g/cc, or 0.855 to 0.867 g/cc (1 cc=1 cm$^3$). In a further embodiment, the interpolymer is an EPDM. In a further embodiment, the diene is ENB. In one embodiment, the alpha-olefin of interpolymer B is the same alpha-olefin of interpolymer A.

In one embodiment, or in combination with any one or more embodiments described herein, the ethylene/α-olefin/non-conjugated diene interpolymer B has a viscosity at 0.1 rad/sec, 190° C., from 400,000 to 700,000 Pa·s, or from 450,000 to 650,000 Pa·s, or from 500,000 to 600,000 Pa·s. In a further embodiment, the interpolymer is an EPDM. In a further embodiment, the diene is ENB. In one embodiment, the alpha-olefin of interpolymer B is the same alpha-olefin of interpolymer A.

In one embodiment, or in combination with any one or more embodiments described herein, the ethylene/α-olefin/non-conjugated diene interpolymer B has a tan delta at 0.1 rad/sec, 190° C., from 1.80 to 2.40 Pa·s, or from 1.85 to 2.30, or from 1.90 to 2.20. In a further embodiment, the interpolymer is an EPDM. In a further embodiment, the diene is ENB. In one embodiment, the alpha-olefin of interpolymer B is the same alpha-olefin of interpolymer A.

The ethylene/alpha-olefin/diene interpolymer B may comprise a combination of two or more embodiments as described herein.

The ethylene/alpha-olefin/diene interpolymer A may comprise a combination of two or more embodiments as described herein.

First Composition A

In one embodiment the first composition A comprises the ethylene/α-olefin/non-conjugated diene interpolymer A and a second ethylene/α-olefin/non-conjugated diene interpolymer. In a further embodiment, each interpolymer is an EPDM. In a further embodiment, the diene is ENB. In one embodiment, each interpolymer has the same alpha-olefin.

In one embodiment, or in combination with any one or more embodiments described herein, the first composition A has a weight average molecular weight (Mw) greater than, or equal to, 100,000 g/mole, or greater than, or equal to, 120,000 g/mole, or greater than, or equal to, 140,000 g/mole, or greater than, or equal to, 160,000 g/mole. In a further embodiment, each ethylene/α-olefin/non-conjugated diene interpolymer is an EPDM. In a further embodiment, the diene is ENB. In one embodiment, or in combination with any one or more embodiments described herein, the first composition A has a weight average molecular weight (Mw) less than, or equal to, 400,000 g/mole, or less than, or equal to, 350,000 g/mole, or less than, or equal to, 300,000 g/mole, or less than, or equal to, 280,000 g/mole. In a further embodiment, each ethylene/α-olefin/non-conjugated diene interpolymer is an EPDM. In a further embodiment, the diene is ENB.

In one embodiment, or in combination with any one or more embodiments described herein, the first composition A has a MWD less than, or equal to, 4.50, further less than, or equal to, 4.00, further less than, or equal to, 3.50. In a further embodiment, each ethylene/α-olefin/non-conjugated diene interpolymer is an EPDM. In a further embodiment, the diene is ENB. In one embodiment, or in combination with any one or more embodiments described herein, the first composition A has a MWD greater than, or equal to, 2.40, or greater than, or equal to, 2.60, or greater than, or equal to, 2.80. In a further embodiment, each ethylene/α-olefin/non-conjugated polyene interpolymer is an EPDM. In a further embodiment, the diene is ENB.

In one embodiment, or in combination with any one or more embodiments described herein, the first composition A has a tan delta (0.1 rad/sec, 190° C.) from 0.80 to 1.40, or from 0.90 to 1.30, or from 1.00 to 1.20. In a further embodiment, each ethylene/α-olefin/non-conjugated diene interpolymer is an EPDM. In a further embodiment, the diene is ENB.

In one embodiment, or in combination with any one or more embodiments described herein, the first composition A has a viscosity at 0.1 rad/sec, 190° C., greater than, or equal to, 100,000 Pa·s, or greater than, or equal to, 120,000 Pa·s, or greater than, or equal to, 140,000 Pa·s. In a further embodiment, each ethylene/α-olefin/non-conjugated diene interpolymer is an EPDM. In a further embodiment, the diene is ENB. The viscosity at 0.1 rad/sec, 190° C. is that of the composition without filler and without oil. In one embodiment, or in combination with any one or more embodiments described herein, the first composition A has a viscosity at 0.1 rad/sec, 190° C., less than, or equal to, 300,000 Pa·s, or less than, or equal to, 250,000 Pa·s, or less than, or equal to, 200,000 Pa·s, or less than, or equal to, 180,000 Pa·s. In a further embodiment, each ethylene/α-olefin/non-conjugated diene interpolymer is an EPDM. In a further embodiment, the diene is ENB. The viscosity at 0.1 rad/sec, 190° C. is that of the composition without filler and without oil.

In one embodiment, or in combination with any one or more embodiments described herein, the first composition A has a rheology ratio (V0.1/V100 at 190° C.) greater than, or equal to, 30, or greater than, or equal to, 35, or greater than, or equal to, 40. In a further embodiment, each ethylene/α-olefin/non-conjugated diene interpolymer is an EPDM. In a further embodiment, the diene is ENB. Each viscosity is that of the composition without filler and without oil. In one embodiment, or in combination with any one or more embodiments described herein, the first composition A has a rheology ratio (V0.1/V100 at 190° C.) less than, or equal to, 60.0, or less than, or equal to, 55.0, or less than, or equal to, 50.0. In a further embodiment, each ethylene/α-olefin/non-conjugated diene interpolymer is an EPDM. In a further embodiment, the diene is ENB. Each viscosity is that of the composition without filler and without oil.

In one embodiment, the first composition A has density from 0.845 to 0.0.890 g/cc, or from 0.848 to 0.880 g/cc, or from 0.870 to 0.860 g/cc, or from 0.852 to 0.860 g/cc (1 cc=1 cm$^3$). In a further embodiment, each ethylene/α-olefin/diene interpolymer is an EPDM. In a further embodiment, the diene is ENB.

In one embodiment, the ratio of the Mw of the ethylene/α-olefin/non-conjugated diene interpolymer B to the Mw of the first composition A is from 1.20 to 2.50, or from 1.40 to 2.30, or from 1.60 to 2.10. In a further embodiment, each ethylene/α-olefin/diene interpolymer (is an EPDM. In a further embodiment, the diene is ENB.

In one embodiment, the ratio of the MWD of the ethylene/α-olefin/non-conjugated diene interpolymer B to the MWD of the first composition A is from 0.55 to 0.95, or from 0.60 to 0.90, or from 0.65 to 0.80. In a further embodiment, each ethylene/α-olefin/diene interpolymer is an EPDM. In a further embodiment, the diene is ENB.

In one embodiment, the ratio of the tan delta (0.1 rad/s, 190° C.) of the ethylene/α-olefin/non-conjugated diene interpolymer B to the tan delta (0.1 rad/s, 190° C.) of the first composition A is from 1.40 to 2.40, or from 1.60 to 2.20, or from 1.80 to 2.00. In a further embodiment, each ethylene/α-olefin/diene interpolymer (is an EPDM. In a further embodiment, each diene is ENB.

In one embodiment, the ratio of the viscosity (0.1 rad/s, 190° C.) of the ethylene/α-olefin/non-conjugated diene interpolymer B to the viscosity (0.1 rad/s, 190° C.) of the first composition A is from 3.10 to 3.80, or from 3.20 to 3.70, or from 3.30 to 3.60. In one embodiment, each ethylene/α-olefin/diene interpolymer is an EPDM. In a further embodiment, each diene is ENB.

In one embodiment, or in combination with any one or more embodiments described herein, the first composition A comprises ≥95 wt %, or ≥96 wt % or ≥97 wt %, or ≥98%, or ≥99 wt % of the sum of the ethylene/alpha-olefin/non-conjugated diene interpolymer A and a second ethylene/alpha-olefin/non-conjugated diene interpolymer, based on the weight of the first composition A. In another embodiment, or in combination with any one or more embodiments described herein, the first composition A comprises ≥95 wt %, or ≥96 wt % or ≥97 wt %, or ≥98%, ≥ or 99 wt % of the ethylene/alpha-olefin/non-conjugated diene interpolymer A, based on the weight of the first composition A. In a further embodiment, each ethylene/α-olefin/diene interpolymer is an EPDM. In a further embodiment, the diene is ENB.

The first composition A may comprise a combination of two or more embodiments as described herein.

Applications

The invention also provides an article comprising at least one component formed from an inventive composition of one or more embodiments described herein. Articles include, but are not limited to, foams, sheets, molded goods, and extruded parts. Additional articles include automotive parts, weather strips, belts, hoses, wire and cable jacketing, flooring materials, gaskets, tires, computer parts, building materials and footwear components. A skilled artisan can readily augment this list without undue experimentation. In one embodiment, the article is an automotive part.

An inventive article may comprise a combination of two or more embodiments described herein.

Definitions

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "first composition," as used herein, includes the material(s), which comprise the first composition, as well as reaction products and decomposition products formed from the materials of the first composition. Any reaction product or decomposition product is typically present in trace or residual amounts. The first composition may contain, for example, one ethylene/α-olefin/non-conjugated polyene interpolymer, or may contain one such interpolymer and one or more additives. The first composition may contain two or more different ethylene/α-olefin/non-conjugated polyene interpolymers, or may contain such interpolymers and one or more additives.

The term "first composition A," as used herein, includes the material(s), which comprise the first composition A, as well as reaction products and decomposition products formed from the materials of the first composition A. Any reaction product or decomposition product is typically present in trace or residual amounts. The first composition A may contain, for example, one ethylene/α-olefin/non-conjugated polyene interpolymer, or may contain one such interpolymer and one or more additives. The first composition A may contain two or more different ethylene/α-olefin/non-conjugated polyene interpolymers, or may contain such interpolymers and one or more additives.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, 50 wt % or a majority wt % of ethylene (based on the weight of the polymer), and optionally may comprise one or more comonomers.

The term "ethylene-based interpolymer," as used herein, refers to a polymer that comprises, in polymerized form, a 50 wt % or a majority wt % of ethylene (based on the weight of the interpolymer), and at least one comonomer.

The term "ethylene/α-olefin/non-conjugated diene interpolymer," as used herein, refers to a polymer that comprises, in polymerized form, ethylene, an α-olefin, and a non-conjugated diene. In one embodiment, the "ethylene/α-olefin/non-conjugated polyene interpolymer" comprises a majority wt % of ethylene (based on the weight of the interpolymer).

The term "ethylene/propylene/non-conjugated diene terpolymer," as used herein, refers to a polymer that comprises, in polymerized form, ethylene, an α-olefin, and a non-conjugated diene, as the only monomer types. In one embodiment, the "terpolymer" comprises a majority wt % of ethylene (based on the weight of the terpolymer).

The term, "ethylene/α-olefin copolymer," as used herein, refers to a copolymer that comprises, in polymerized form, 50 wt % or a majority wt % of ethylene monomer (based on the weight of the copolymer), and an α-olefin, as the only two monomer types.

The term, "propylene-based polymer," as used herein, refers to a polymer that comprises, in polymerized form, a majority wt % of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples that are measured for density are prepared according to ASTM D-1928. Measurements are made within one hour of sample pressing using ASTM D-792, Method B.

Conventional Gel Permeation Chromatography (Conv. GPC)

A GPC-IR high temperature chromatographic system from, PolymerChAR (Valencia, Spain), was equipped with a Precision Detectors (Amherst, Mass.), 2-angle laser light scattering detector Model 2040, an IR5 infra-red detector and a 4-capillary viscometer, both from PolymerChAR. Data collection was performed using PolymerChAR InstrumentControl software and data collection interface. The system was equipped with an on-line, solvent degas device and pumping system from Agilent Technologies (Santa Clara, Calif.).

Injection temperature was controlled at 150 degrees Celsius. The columns used were three 10-micron "Mixed-B" columns from Polymer Laboratories (Shropshire, UK). The solvent used was 1,2,4 trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was 200 microliters, and the flow rate was one milliliters/minute. The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(conv\ gpc) = \frac{\sum_{i=RV\ \text{integration start}}^{i=RV\ \text{integration end}} (IR_{measurement\ channel_i})}{\sum_{i=RV\ \text{integration start}}^{i=RV\ \text{integration end}} (IR_{measurement\ channel_i}/\text{Log}M_{PE_i})} \quad \text{(Eqn. 2)}$$

$$Mw(conv\ gpc) = \frac{\sum_{i=RV\ \text{integration start}}^{i=RV\ \text{integration end}} (\text{Log}M_{PE_i} IR_{measurement\ channel_i})}{\sum_{i=RV\ \text{integration start}}^{i=RV\ \text{integration end}} (IR_{measurement\ channel_i})} \quad \text{(Eqn. 3)}$$

$$Mz(conv\ gpc) = \frac{\sum_{i=RV\ \text{integration start}}^{i=RV\ \text{integration end}} (\text{Log}M_{PE_i}^2 IR_{measurement\ channel_i})}{\sum_{i=RV\ \text{integration start}}^{i=RV\ \text{integration end}} (\text{Log}M_{PE_i} IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and Log $M_{PE}$ is derived from the polyethylene-equivalent MW determined from Equation 1. Data calculation were performed using "GPC One software (version 2.013H)" from PolymerChAR.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples, from 1 to 3%. The stress response was analyzed in terms of amplitude and phase, from which, the storage modulus (G'), loss modulus (G"), dynamic viscosity η*, tan delta, and phase angle were determined. The viscosities V0.1 at 190° C. and V100 at 190° C., and rheology ratio (V0.1/V100 at 190° C.; also referred to as "RR") were recorded. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes.

13C NMR Method for EPDM Composition Analysis

The samples were prepared by adding approximately "2.6 g of a 50/50 mixture of tetrachloroethane-d2/orthodichlorobenzene containing 0.025M in chromium acetylacetonate (relaxation agent)" to "0.2 g sample" in a "10 mm" NMR tube. The samples were dissolved and homogenized by heating the tube and its contents to 150° C. The data were collected using a Bruker 400 MHz spectrometer, equipped with a Bruker Dual DUL high-temperature CryoProbe. The data was acquired using 160 scans per data file, a 6 second pulse repetition delay, with a sample temperature of 120° C. The acquisition was carried out using a spectral width of 25,000 Hz and a file size of 32K data points.

NMR spectral analyses of the composition of the examples were carried out using the following analysis method. Quantitation of monomers present in EPDM can be calculated using the following equations (1A through 9A).

The calculation of moles ethylene normalizes the spectral range from 55.0-5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2},$$ Equation 1A $$molesENB = CH3(13.6 - 14.7 \text{ ppm}),$$ Equation 2A $$molesP = CH3(19.5 - 22.0 \text{ ppm}),$$ Equation 3A $$mole\%ethylene = \frac{100*molesE}{molesE + molesP + molesENB},$$ Equation 4A $$mole\%propylene = \frac{100*moles}{molesE + molesP + molesENB},$$ Equation 5A $$mole\%ENB = \frac{100*molesENB}{molesE + molesP + molesENB},$$ Equation 6A $$Wt\%ethylene = \frac{100*moles\%E*28}{mole\%E*28 + mole\%P*42 + moleENB*120},$$ Equation 7A $$Wt\%propylene = \frac{100*mole\%P*42}{mole\%E*28 \rightleftarrows mole\%P*42 + mole\%ENB*120},$$ Equation 8A $$Wt\%ENB = \frac{100*mole\%ENB*120}{mole\%E*28 + mole\%P*42 + mole\%ENB*120}.$$ Equation 9A Further NMR spectral analysis of some inventive interpolymers displays a peak area, from 21.3 ppm to 21.8 ppm (% PP Tacticity Marker), greater than 3.0% (further greater than 4.0%) of the total integral area from 19.5 ppm to 22.0 ppm. Spectral data are referenced to the EEE backbone at 30 ppm. Peak responses in this region have been typically related to differences in propylene tacticity incorporated into the polymer. A similar analysis can be done for another type of ethylene/α-olefin/non-conjugated polyene interpolymer.

Further NMR spectral analysis of some inventive EPDMs displayed a peak area (corresponding to $CH_3$ of the aliphatic chain end) from chemical shift region 14.0 to 14.3 ppm, which when the total integrated area (chemical shift region 1 to 55 ppm) is set to a value of 1000, integrates to a peak area greater than 0.5 (>0.5 chain ends per 1000 carbons, ACE). Similar spectral analysis of the comparative EPDMs showed less than 0.5 ACE or non detected of the total integral area from 10 to 55 ppm. Spectral data were referenced to the EEE backbone at 30 ppm. Peak responses in this region typically are related to differences in chain ends that have been incorporated into the EPDM. A similar analysis can be done for another type of ethylene/α-olefin/non-conjugated polyene interpolymer.

Mooney Viscosity

Mooney Viscosity (ML1+4 at 100° C., or 125° C.) and Mooney Stress Relaxation were measured in accordance with ASTM 1646, with a one minute preheat time and a four minute rotor operation time, using the Large rotor. The instrument is an Alpha Technologies Mooney Viscometer 2000.

The viscosity of each formulated compositions was measured using an uncured blanket (see experimental section), so that the viscosity of the uncured composition could be examined. Samples were conditioned for 24 hours at room temperature, prior to testing. Mooney relaxation area was determined by suddenly stopping the rotor at the end of the Mooney viscosity test, and observing the torque as it decays. The collection of data started one second after stopping the rotor, and continued, until 100 seconds had passed, since the rotor was stopped. The area under the torque-time curve ("MLRA") is indicative of the amount of stored elastic energy in the polymer.

Mooney Scorch

Scorch properties of each composition was measured in accordance to ASTM D-1646, using an Alpha Technologies Mooney Viscometer 2000. Mooney viscometer was set at 125° C. The Mooney scorch values were reported for a small rotor, and represented the time to rise "x Mooney units" above the minimum viscosity (e.g. t5 is a "five Mooney unit" increase in viscosity). The total test time was 30 minutes, with a 1 minute preheat time. The viscosity of each composition was measured from uncured blanket, cured in the viscometer, so that the scorch properties could be examined. Samples were conditioned for at least 24 hours at room temperature, prior to testing.

RPA Analysis

Curing characteristics of each formulation were measured in accordance with ASTM D-6204, using an Alpha Technologies Rheometer RPA 2000P. The rheology of each formulated composition was measured from samples of uncured blanket, which was then cured during the RPA analysis. Samples were conditioned for at least 24 hours, at room temperature, prior to testing. The RPA test was carried out at 160° C. and 180° C., over a 25 minutes. The RPA die oscillating frequency was set at 100 cycle per minute (CPM), shear strain was set at 7%. The viscoelastic properties, such as minimum torque (ML), maximum torque (MH), tan delta at minimum torque, tan delta at maximum torque, and time to reach a certain percentage of the torque at the end of the test or the maximum torque, whichever is higher (for example, tc95 corresponds to the time in minutes to reach the 95% of the torque at the end of the test or the maximum torque, whichever is higher), were measured during the cure cycle.

EXPERIMENTAL

The following examples illustrate the present invention, but are not intended to limit the scope of the invention. Materials are shown in Table 1.

TABLE 1

Brand name and suppliers of ingredients and raw materials

| Component | Brand name | Characteristic | Supplier |
|---|---|---|---|
| ZnO | RHENOGRAN ® ZNO-85 | activator | Rheinchemie |
| Stearic acid | STEARIC ACID | activator | National pharm |
| PEG 4000 | CARBOWAX | process aid | DOW |
| Carbon black N-550 | SPHERON 5000A | filler | Cabot |
| Carbon black N-774 | SPHERON 6400A | filler | Cabot |
| CaCO3 | OMYACARB | filler | Omya |
| Paraffinic oil | HYDROBRITE 550 | plasticizer | Sonneborn |
| CaO | RHENOGRAN ® CAO-80 | desiccant | Rheinchemie |
| MBTS-80 | RHENOGRAN ® MBTS-75 | accelerator | Rheinchemie |

TABLE 1-continued

Brand name and suppliers of ingredients and raw materials

| Component | Brand name | Characteristic | Supplier |
|---|---|---|---|
| ZBEC-70 | RHENOGRAN ® ZBEC-70 | accelerator | Rheinchemie |
| TBzTD-70 | RHENOGRAN ® TBZTD-70 | accelerator | Rheinchemie |
| Geniplex-70 | GENIPLEX-70 | accelerator | Rheinchemie |
| S-80 | RHENOGRAN ® S-80 | curative | Rheinchemie |
| OBSH | CELOGEN OT (OBSH) | Foaming agent | CelChem |

Continuous Polymerizations

In general terms, it is desirable to produce the inventive polymer under the conditions as explained in U.S. Pat. Nos. 5,977,251 and 6,545,088, and the references therein. The polymer products were produced in a solution polymerization process.

Ethylene was introduced in a mixture of a solvent of ISOPAR E (a mixture of C8-C10 saturated hydrocarbons available from ExxonMobil), propylene and 5-ethylidene-2-norbornene (ENB), forming the reactor feed stream. Catalyst is fed to the reactor separately and activated in-situ using co-catalyst 1 and co-catalyst 2. The outlet of the reactor was consequently a mixture of polymer, solvent, and reduced levels of the initial monomer streams. The molecular weight of the polymer may be controlled by adjusting reactor temperature, monomer conversion and/or the addition of a chain terminating agent, such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate.

The first composition was prepared using a first CSTR reactor (20.1 gal) and a second loop reactor (30.6 gal). The example designated with "R1" was a sampled aliquot from the first reactor, and represents the polymer composition that was fed to the second reactor. The aliquot (polymer and solvent sample) was collected and subsequently dried, in-vacuo, to recover the polymer. The EPDM B was prepared using a CSTR reactor (20.1 gal). Polymer was collected from the single operation, and passed through the back-end operation and pelletized. Polymerization conditions are shown in Tables 1A, 1B, 2A and 2B. Polymer properties are shown in Tables 3.

Simulated Study (GPC and Rheology)

A GPC simulation on several first compositions was performed, using a weight fraction distribution. In this distribution model, both of the chromatographic GPC peaks use a Flory-Schulz distribution with a polydispersity of 2, which has been convoluted (and thus broadened in polydispersity) with a differential normal distribution function of width in log(M) units. The convergence of the two peaks was performed using the "Solver Add-In" that is part of Microsoft Excel™ version 14, based on minimizing the sum of squares of the residuals between the model distribution (based on 2 broadened Flory-Schultz Distributions) and the measured MWD via GPC. It is important to note that the distributions calculated by GPC for the subject samples are that of "Conventional GPC," which are equivalent to poly-ethylene-homopolymer analogs (molecular weight of the longest contiguous backbone chain) of the subject copolymers (which may comprise the absolute molecular weight including branches). Thus LCB and SCB are not accounted for in the measured or modeled distributions. Variables that were iterated were weight fraction of the peak, the molecular weight target of the Flory Distribution, and a width parameter representing the convolution of Flory-Schultz distributions about a normal distribution. It should be noted that with a width parameter of 0, there is no convolution and the distribution is that of a Flory-Schulz.

Simulated rheology parameters were obtained from a linear interpolation between the V0.1 and TD0.1 properties of representative A and B components, using the following equations: $V_{0.1}=X_A V_{0.1A}+X_B V_{0.1B}$, where $V_{0.1}$ is the viscosity (0.1 rad/s, 190° C.) of the first comp., $X_A$ is the weight fraction of the first comp. A, $V_{0.1A}$ is the viscosity (0.1 rad/s, 190° C.) of the first comp. A, $X_B$ is the weight fraction of the EPDM B, $V_{0.1B}$ is the viscosity (0.1 rad/s, 190° C.) of EPDM B; and $TD_{0.1}=X_A TD_{0.1A}+X_B TD_{0.1B}$, where $TD_{0.1}$ is the tan delta (0.1 rad/s, 190° C.) of the first comp., $X_A$ is the weight fraction of the first comp. A, $TD_{0.1A}$ is the tan delta (0.1 rad/s, 190° C.) of the first comp. A, $X_B$ is the weight fraction of the EPDM B, $TD_{0.1B}$ is the tan delta (0.1 rad/s, 190° C.) of EPDM B. The properties of first composition A (100%) and EPDMB (100%) are measured properties.

It has been discovered that a first composition with the right weight ratio of A/B, meets the relationship of Equation A ($4.50<[(Mz/Mn)_{(first\ comp.)}]/(TD0.1_{(first\ comp.)})<8.0$), has a good balance of high, medium and low molecular weight polymer fractions, and provides an excellent balance of high melt elasticity, high cure rate, and good processability. The first composition, when formulated with oil, filler, blowing agents etc., form sponges (foams) with excellent properties as discussed below.

The comparative first composition with weight ratios (A/B) less than 1 and weight ratios greater than 20, do not meet the desired Eqn A, and thus do not have balance of high, medium and low molecular weight polymer fractions, for an excellent balance of high melt elasticity, high cure rate, and good processability.

Final compositions are shown in Table 5. A standard "up-side down" mix was used, with CaCO3, carbon black, oil, stearic acid and EPDM added initially in a Banbury mixer, at a rotor speed of 30 rpm and ambient temperature and atmosphere. The ZnO and other curatives were added in the sweep (at 65° C.). The intermediate composition was dropped at 100° C. Mixing of this composition was completed on a 6 inch, two roll mill at ambient conditions, and the composition was "sheeted out" in the form of a blanket. After cooling, this sheeted composition was re-introduced back in the Banbury mixer. After fluxing, the foaming agent (i.e., Celogen OT) was added, and the composition was dropped at 70° C. After milling, the entire composition was cut in strips, in preparation for extrusion and further testing.

Sponge Foaming

The milled composition sheets, with thickness of 3 mm, were cut into strip shaped samples (dimensions of each sample was 5 mm by 20 mm), and foamed in hot air oven for four minutes, at various temperatures (160/165/170/180/200° C.).

TABLE 1A

First Composition A (CSTR (Rx1) followed by Loop Reactor (Rx2))

| | H2 (mol %)$^A$ | | C2 Conc. [g/L] | | Catalyst Efficiency* [lb_poly/lb_metal] * 10E6 A | | Catalyst Flow* [lb/hr] Catalyst A* | | Catalyst Solution Conc. (ppm) | | Cocat-1** Flow [lb/hr] | |
|---|---|---|---|---|---|---|---|---|---|---|---|---|
| | Rx1 | Rx2 | Rx1 | Rx2 | Rx1 | Rx2 | Rx1 | Rx2 | Rx1 | Rx2 | Rx1 | Rx2 |
| First Comp. A | 0.17 | 2.00 | 10.29 | 6.09 | 0.70 Cat A | 1.02 Cat A | 0.33 Cat A | 0.48 Cat A | 49.90 | 49.90 | 0.36 | 0.53 |

| | Cocat-1 Solution Conc. [ppm] | | Cocat-2*** Flow [lb/hr] | | Cocat-2 Solution Conc. [ppm] | | Production Rate [lb/hr] | |
|---|---|---|---|---|---|---|---|---|
| | Rx1 | Rx2 | Rx1 | Rx2 | Rx1 | Rx2 | Rx1 | Rx2 |
| First Comp. A | 599.60 | 599.60 | 0.23 | 0.31 | 390.60 | 390.60 | 11.65 | 23.54 |

*Catalyst A: [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl
**Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,988 (Ex. 2). Cocatalyst-1 was purchased from Boulder Scientific, and used without further purification.
***Cocatalyst-2 (modified methylalumoxane (MMAO)) was purchased from Akzo Nobel, and used without further purification.
A: The mole % H2 is relative to the total reactant monomer feed to produce the polymer (C2, C3, ENB).

TABLE 1B

EPDM B (CSTR (Rx1))

| | H2 (mol %) | | C2 Conc. [g/L] | | Catalyst Efficiency* [lb_poly/lb_metal] * 10E6 Catalyst B | | Catalyst Flow* [lb/hr] Catalyst B | | Catalyst Solution Conc. (ppm) | | Cocat-1** Flow [lb/hr] | |
|---|---|---|---|---|---|---|---|---|---|---|---|---|
| | Rx1 | Rx2 | Rx1 | Rx2 | Rx1 | Rx2 | Rx1 | Rx2 | Rx1 | Rx2 | Rx1 | Rx2 |
| EPDM B | 0.02 | NA | 17.67 | NA | 5.29 Cat B | NA | 0.36 Cat B | NA | 8.91 | NA | 0.82 | NA |

| | Cocat-1 Solution Conc. [ppm] | | Cocat-2*** Flow [lb/hr] | | Cocat-2 Solution Conc. [ppm] | | Production Rate [lb/hr] | |
|---|---|---|---|---|---|---|---|---|
| | Rx1 | Rx2 | Rx1 | Rx2 | Rx1 | Rx2 | Rx1 | Rx2 |
| EPDM B | 99.01 | NA | 0.96 | NA | 48.83 | NA | 17.12 | NA |

*Catalyst B: [[6',6'''-((2R,4S)-pentane-2,4-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)]] (2-)]-zirconium dimethyl.
**Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,988 (Ex. 2). Cocatalyst-1 was purchased from Boulder Scientific, and used without further purification.
***Cocatalyst-2 (modified methylalumoxane (MMAO)) was purchased from Akzo Nobel, and used without further purification.
NA: Not Applicable.
A: The mole % H2 is relative to the total reactant monomer feed to produce the polymer (C2, C3, ENB).

TABLE 2A

First Composition A (CSTR (Rx1) followed by Loop Reactor (Rx2))

| | Reactor Temp. [deg C.] | | Pressure [psig] | | Solvent Feed [lb/hr] | | Ethylene Feed [lb/hr] | | Propylene Feed [lb/hr] | | ENB Feed [lb/hr] | | % C2 Conversion | | Reactor Configuration | |
|---|---|---|---|---|---|---|---|---|---|---|---|---|---|---|---|---|
| | Rx1 | Rx2 | Rx1 | Rx2 | Rx1 | Rx2 | Rx1 | Rx2 | Rx1 | Rx2 | Rx1 | Rx2 | Rx1 | Rx2 | Rx1 | Rx2 |
| First Comp A | 94.26 | 148.38 | 647.17 | 653.66 | 133.27 | 38.77 | 9.39 | 10.41 | 7.51 | 21.98 | 2.68 | 3.76 | 72.13 | 80.48 | CSTR | LOOP |

TABLE 2B

EPDM B (CSTR)

| | Reactor Temp. [deg C.] | | Pressure [psig] | | Solvent Feed [lb/hr] | | Ethylene Feed [lb/hr] | | Propylene Feed [lb/hr] | | ENB Feed [lb/hr] | | % C2 Conversion | | Reactor Configuration | |
|---|---|---|---|---|---|---|---|---|---|---|---|---|---|---|---|---|
| | Rx1 | Rx2 | Rx1 | Rx2 | Rx1 | Rx2 | Rx1 | Rx2 | Rx1 | Rx2 | Rx1 | Rx2 | Rx1 | Rx2 | Rx1 | Rx2 |
| EPDM B | 111.20 | NA | 648.07 | NA | 148.38 | NA | 14.68 | NA | 18.55 | NA | 4.16 | NA | 62.10 | NA | CSTR | NA |

NA: Not Applicable.

TABLE 3

First Composition A and EPDM B (with oil and without oil)

| EPDM | Mooney Viscosity ML1 + 4, 125° C., MU | Oil wt % | Ethylene wt % | ENB wt % | Mw, g/mol | Mz, g/mol | V0.1 rad/s, Pa · s | V100 rad/s, Pa · s | V0.1/V100 | TanDelta @ 0.1 rad/s | MWD |
|---|---|---|---|---|---|---|---|---|---|---|---|
| First Comp. A | 20 | 28 | 57 | 8.5 | 241000 | 576,737 | 28022 | 1196 | 43 | 1.60 | 3.15 |
| EPDM-B | 50 | 50 | 65 | 5.1 | 415849 | 708,796 | 566730 | 17710 | 32 | 2.07 | 2.20 |
| N | | | | | | Neat polymer properties* | | | | | |
| First Comp. A | NR | 0 | 57 | 8.5 | 241000 | 576,737 | 159600 | 3765 | 42.5 | 1.05 | 3.15 |
| EPDM-B | 98 | 0 | 65 | 5.1 | 415849 | 708,796 | 566730 | NR — | NR — | 2.07 | 2.20 |

Mooney Viscosity of neat polymers are calculated from tested number oil-included rubber samples using equation:
Oil – included polymer viscosity = Neat polymer viscosity × polymer volume percentage[3,4].
*The neat polymers from reactor samples without oil.
Densities of First Composition A and EPDM B are 0.855 and 0.865 g/cc, respectively g/cc (each neat polymer).
NR: Values not reported by measurement

TABLE 4

First Composition GPC and Rheology Properties

| First Comp. A | B | A/B Ratio | EPDM Mn | Mw | Mz | Mw/Mn | Mz/Mn | V0.1 at 190° C., Pa · s no oil | TD0.1 at 190° C., no oil | Mz/TD0.1 g/mol | [(Mz/TD0.1)]/ (Mw/Mn) Eqn. B g/mol | (Mz/Mn)/ (TD0.1) Eqn. A |
|---|---|---|---|---|---|---|---|---|---|---|---|---|
| 100 | 0 | | 61831 | 207395 | 548684 | 3.354 | 8.8739 | 159600 | 1.06 | 517626 | 154322 | 8.37 |
| 96.2 | 3.8 | 25.0 | 63307 | 214277 | 559630 | 3.385 | 8.8399 | 174848.8 | 1.10 | 510539 | 150836 | 8.06 |
| 95.2 | 4.8 | 20.0 | 63669 | 215917 | 562135 | 3.391 | 8.8290 | 178480 | 1.10 | 508829 | 150042 | 7.99 |
| 95 | 5 | 19.0 | 63764 | 216344 | 562780 | 3.393 | 8.8260 | 179424 | 1.11 | 508383 | 149838 | 7.97 |
| 90 | 10 | 9.0 | 65824 | 225305 | 575774 | 3.423 | 8.7472 | 199247 | 1.15 | 498937 | 145767 | 7.58 |
| 80 | 20 | 4.0 | 70381 | 243265 | 598934 | 3.456 | 8.5098 | 238894 | 1.25 | 479915 | 138849 | 6.82 |
| 70 | 30 | 2.3 | 75633 | 261276 | 618962 | 3.455 | 8.1838 | 278541 | 1.34 | 461224 | 133512 | 6.10 |
| 60 | 40 | 1.5 | 81749 | 279338 | 636453 | 3.417 | 7.7854 | 318188 | 1.44 | 443213 | 129708 | 5.42 |
| 50 | 50 | 1.0 | 88964 | 297451 | 651861 | 3.343 | 7.3272 | 357835 | 1.53 | 426053 | 127428 | 4.79 |
| 40 | 60 | 0.7 | 97603 | 315615 | 665536 | 3.234 | 6.8188 | 397482 | 1.62 | 409813 | 126734 | 4.20 |
| 30 | 70 | 0.4 | 108133 | 333830 | 677755 | 3.087 | 6.2678 | 437129 | 1.72 | 394502 | 127786 | 3.65 |

TABLE 4-continued

First Composition GPC and Rheology Properties

| First Comp. A | B | A/B Ratio | EPDM Mn | Mw | Mz | Mw/Mn | Mz/Mn | V0.1 at 190° C., Pa · s no oil | TD0.1 at 190° C., no oil | Mz/TD0.1 g/mol | [(Mz/TD0.1)]/(Mw/Mn) Eqn. B g/mol | (Mz/Mn)/(TD0.1) Eqn. A |
|---|---|---|---|---|---|---|---|---|---|---|---|---|
| 20 | 80 | 0.3 | 121251 | 352097 | 688739 | 2.904 | 5.6803 | 476776 | 1.81 | 380099 | 130894 | 3.13 |
| 10 | 90 | 0.1 | 138046 | 370416 | 698667 | 2.683 | 5.0611 | 516423 | 1.91 | 366562 | 136609 | 2.66 |
| 5 | 95 | 0.1 | 148341 | 379595 | 703280 | 2.559 | 4.7410 | 536246.5 | 1.95 | 360103 | 140724 | 2.43 |
| 0 | 100 | 0.0 | 160314 | 388788 | 707683 | 2.425 | 4.4143 | 556070 | 2.00 | 353841 | 145904 | 2.21 |

TABLE 5

Inventive and Comparative Formulations (Parts)

| | Comparative formulation F-a | Inventive example F-1 | Inventive example F-2 | Comparative formulation F-b | Inventive example F-3 | Inventive example F-4 |
|---|---|---|---|---|---|---|
| First Comp. A | 100.0 | 89.9 | 95.0 | 100.0 | 89.9 | 95.0 |
| EPDM-B | | 10 | 5 | | 10 | 5 |
| Oil included in EPDM A* | 39.0 | 35.1 | 37.0 | 39.0 | 35.1 | 37.0 |
| Oil included in EPDM B* | 0 | 10 | 5 | 0 | 10 | 5 |
| FEF Black N550 | | | | 60 | 60 | 60 |
| SRF Black N774 | 140 | 140 | 140 | 60 | 60 | 60 |
| CaCO3 | 55 | 55 | 55 | 40 | 40 | 40 |
| HYDROBRITE 550** | 61 | 55 | 58 | 36 | 30 | 33.04 |
| ZnO-80 | 6.25 | 6.25 | 6.25 | 6.25 | 6.25 | 6.25 |
| Stearic Acid | 2 | 2 | 2 | 1.5 | 1.5 | 1.5 |
| CaO-80 | 6.25 | 6.25 | 6.25 | 6.25 | 6.25 | 6.25 |
| PEG-4000 | 3 | 3 | 3 | 3 | 3 | 3 |
| Sulphur-80 | 1.875 | 1.875 | 1.875 | 1.25 | 1.25 | 1.25 |
| MBTS-75 | 1.5 | 1.5 | 1.5 | 1.5 | 1.5 | 1.5 |
| ZBEC-70 | 0.715 | 0.715 | 0.715 | 0.715 | 0.715 | 0.715 |
| TBzTD-70 | 1.15 | 1.15 | 1.15 | 1.15 | 1.15 | 1.15 |
| RHENOGRAN Geniplex-70 | 1 | 1 | 1 | 1 | 1 | 1 |
| Celogen OT (OBSH) | 3.0 | 3.0 | 3.0 | 3.0 | 3.0 | 3.0 |
| Total (parts) | 421.7 | 421.7 | 421.7 | 360.6 | 360.6 | 360.7 |
| Neat polymer ratio EPDM-A/EPDM-B | 100/0 | 9.0 | 19.0 | 100/0 | 9.0 | 19.0 |
| Polymer content wt % | 23.7% | 23.7% | 23.7% | 27.7% | 27.7% | 27.7% |
| Total oil content (wt %) | 24% | 24% | 24% | 21% | 21% | 21% |

*Oil included in EPDM-A and B is PARALUX 6001.
**Oil added is HYDROBRITE 550.

Compositions containing 23.7 wt % polymer content (based on wt composition) are considered "low rubber content formulations, and compositions containing 27.7 wt % polymer content (based on wt of composition) are considered high rubber content formulations.

Sponge Cell Morphology and Surface Quality

Sponge cell morphology was analyzed using an optical microscope equipped with a digital camera. The inventive examples (Example F-1, F-2, F-3, F-4) made with a blend of EPDM-A and EPDM-B show higher Mooney relaxation area (MLRA) than the pure EPDM (F-a, F-b) comparative, as shown in Table 6. Higher Mooney relaxation area means the rubber composition has higher melt elasticity, and therefore better carbon black incorporation during mixing, improved dimension stability during extrusion, and better bubble stability during foaming. Thus, such compositions can be used to produce excellent closed cell morphology and nice skin surface.

TABLE 6

Compound Mooney Viscosity and Stress Relaxation Area

|  | Comparative formulation F-a | Inventive example F-1 | Inventive example F-2 | Comparative formulation F-b | Inventive example F-3 | Inventive example F-4 |
| --- | --- | --- | --- | --- | --- | --- |
| ML1 + 4, 100° C. | 28.79 | 34.53 | 28.61 | 27.02 | 44.30 | 39.83 |
| MLRA | 226.90 | 260.95 | 228.09 | 156.07 | 338.33 | 269.44 |
| MLRA/ML | 7.90 | 7.61 | 7.97 | 5.78 | 7.64 | 6.76 |
| A (intercept) | 7.62 | 9.51 | 7.09 | 7.56 | 14.10 | 12.55 |
| K (slope) | −0.38 | −0.40 | −0.36 | −0.49 | −0.44 | −0.48 |

Curing and Foaming Characteristics

Figure 2:
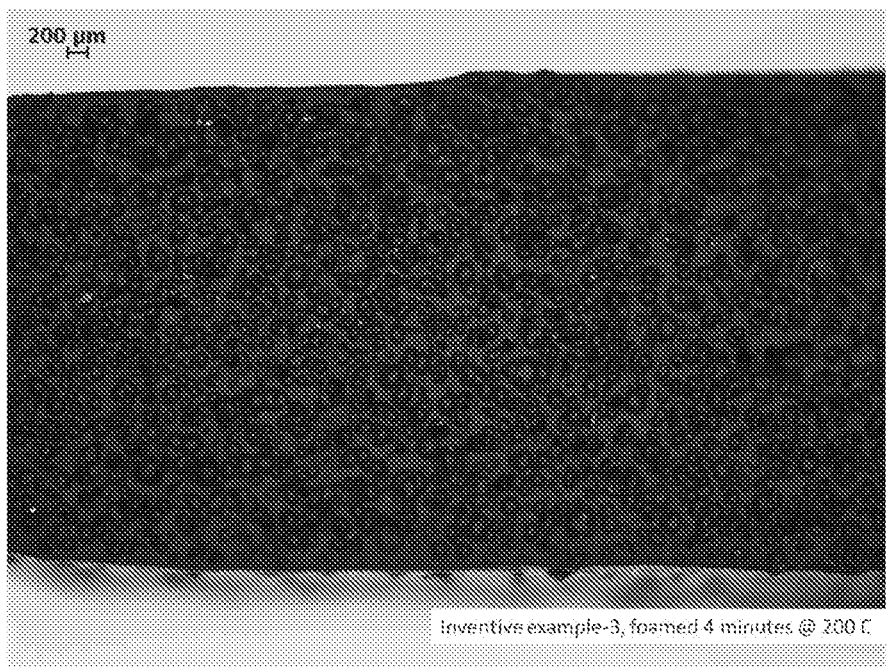
FIG. 2 is an optical micrograph of the morphology of a sponge formed by inventive composition F-3.

A Rubber Processing Analyzer-2000P (RPA) from Alpha Technology was used to analyze the compounds curing properties, curing and forming curves, and rheological properties. Curing and forming curves were determined at 180° C., the oscillation frequency was set at 100 CPM (1.67 Hz); and the oscillating angle was 0.5 degree (7% strain). The chamber filler factor was set at 0.62. As shown in Table 7, blending EPDM-B into First Composition A increases the ML, and results in a high curing density, as indicated by a high MH-ML value. It has been discovered that the EPDM-B improves the composition's elasticity, both before curing, during curing and after curing, and therefore provides improved bubble stabilization during sponge foaming process, reduces bubble burst, and provides better surface smoothness. Comparing the pressure and the curing density building up rate, the inventive examples have synchronized pressure-torque building up rate for a good balanced foaming and curing, and generate a foam with a closed cell structure and smooth surface. See, for example, FIGS. 1 and 2.

Compared with the comparative compositions, the inventive compositions have comparable or smaller foam density, when foamed at various temperatures such as from 160 to 200° C., as seen in Table 8.

It has been discovered that the inventive compositions containing the first composition A and the EPDM-B provides a unique distribution of molecular weight fractions and overall MWD, which provides excellent processability and foamability for the production of foamed sponge, with smooth surface and excellent aesthetics. It has also been discovered that the inventive compositions show high Mooney relaxation, which, in turn, provides higher melt elasticity, better carbon black incorporation during mixing, improved dimension stability during extrusion, and better bubble stability during foaming, to produce excellent closed cell morphology and smooth skin surface.

First composition A has high diene level and high long chain branching level, as indicated by high V0.1/V100 value (e.g., 42.5) and low tan delta (e.g., 1.05). It has been discovered that its high diene level (e.g., 8.5%) enables a fast cure rate, well balanced with a steady decomposition rate and gas generation rate of the blowing agents. It has been discovered that its high long chain branching level high provides good melt elasticity for high shape retention and good bubble stability during extrusion foaming. Its low oil-extended Mooney viscosity (e.g., 20 MU) and relatively broad molecular weight distribution (e.g., 3.1-3.4) provide for excellent mixing, compounding and extrusion performance. The low ethylene content (e.g., 57 wt %) offers great elasticity and compression set resistance of the end sponge formulation. EPDM-B has medium diene level (e.g., 5.1 wt %), an ultra high Mw (415-416K g/mol), and narrow molecular weight distribution (e.g., 2.2-2.4); it also has a linear chain structure with low levels of long chain branching, as indicated by a high tan delta (e.g., 2.0-2.1). Its high ethylene content (e.g., 65 wt %) offers good tensile strength, elongation, and ultimate physical properties. It has been discovered that the ultra high Mooney viscosity of EPDM-B, in combination with the first composition A, provides improved melt strength and elasticity, and therefore better shape retention, dimension stability and bubble stability, during extrusion foaming, to produce excellent closed cell morphology and nice skin surface.

TABLE 7

Curing Characteristics Tested using RPA at 180° C.

| Rheometer (RPA), 180° C., 0.5 degree arc | Comp. F-a | Inv. F-1 | Inv. F-2 | Comp. F-b | Inv. F-3 | Inv. F-4 |
| --- | --- | --- | --- | --- | --- | --- |
| ML (dNm) | 0.57 | 0.98 | 0.55 | 0.69 | 1.25 | 1.11 |
| MH (dNm) | 10.40 | 13.30 | 12.15 | 12.20 | 10.76 | 14.03 |
| MH − ML (dNm) | 9.83 | 12.32 | 11.60 | 11.51 | 9.51 | 12.92 |
| ts2 (min) | 0.54 | 0.57 | 0.57 | 0.54 | 0.35 | 0.43 |
| t10 (min) | 0.76 | 0.82 | 0.88 | 0.80 | 1.00 | 0.74 |
| t90 (min) | 3.68 | 3.42 | 2.78 | 2.20 | 3.21 | 2.22 |
| t95 (min) | 5.49 | 4.89 | 3.86 | 2.92 | 4.40 | 3.22 |

TABLE 8

Foam Densities of the Sponged Foamed at Various Temperatures

|  | Comp. F-a | Inv. F-1 | Inv. F-2 | Comp. F-b | Inv. F-3 | Inv. F-4 |
|---|---|---|---|---|---|---|
| 160° C.-Foam density (g/cc) | 0.982 | 0.99 | 0.972 | 1.131 | 1.037 | 0.813 |
| 165° C.-Foam density (g/cc) | 0.846 | 1.103 | 0.859 | 1.05 | 0.902 | 0.772 |
| 170° C.-Foam density (g/cc) | 0.734 | 0.697 | 0.766 | 0.948 | 0.792 | 0.729 |
| 180° C.-Foam density (g/cc) | 0.717 | 0.68 | 0.743 | 0.741 | 0.783 | 0.725 |
| 200° C.-Foam density (g/cc) | 0.707 | 0.678 | 0.732 | 0.696 | 0.714 | 0.724 |

Additional Comparative Compositions

Additional comparative compositions are listed in Table 9. The first composition inventive examples have the characteristic of having polymer chains that are high in molecular weight and having branching, to have balanced elasticity for the claimed application use. The inventive compositions have a good balanced of elasticity required by rubber compounds for good shape retention, dimension stability and bubble stability, during extrusion foaming, to produce excellent closed cell morphology and smooth skin surface. The comparative compositions in Table 9 do not have the proper balance of such parameters, and lack the balanced elasticity, and would produce poorer quality foams.

TABLE 9

First Composition GPC and Rheology Properties

| First Composition | Mn (g/mol) | Mz (g/mol) | Mw/Mn | TD0.1 at 190° C., no oil | Mz/TD0.1 | [(Mz/TD0.1)]/ (Mw/Mn) Eqn. B | (Mz/Mn)/(TD0.1) Eqn. A |
|---|---|---|---|---|---|---|---|
| KELTAN 4903 | 69630 | 868400 | 3.59 | 0.74 | 1173514 | 323,884 | 16.85 |
| NORDEL IP5565 | 54090 | 434100 | 3.33 | 1.55 | 280065 | 84,104 | 5.18 |

What is claimed is:

1. A composition comprising at least one oil and a first composition, wherein the first composition comprises:
   component A) comprising an ethylene/α-olefin/non-conjugated diene interpolymer A,
   component B) comprising an ethylene/α-olefin/non-conjugated diene interpolymer B; and
   wherein the weight ratio of component A to component B is from 1/1 to 20/1;
   wherein the weight average molecular weight (Mw) of the ethylene/α-olefin/non-conjugated diene B is greater than the weight average molecular weight (Mw) of component A;
   wherein the composition has a Mooney Viscosity (ML1+4, 100° C.) from 20 to 100; and
   wherein the first composition meets the following Equation A: $4.50 < [(Mz/Mn)_{(first\ comp.)}/(TD0.1_{(first\ comp.)})] < 8.00$ (Eqn. A), wherein $TD0.1_{(first\ comp.)}$ is the tan delta of the first composition at 0.1 rad/sec and 190° C.

2. The composition of claim 1, wherein the first composition comprises ≥95 wt % of components A and B, based on the weight of the first composition.

3. The composition of claim 1, wherein the composition comprises ≥95 wt % of the oil and the first composition, based on the weight of the composition.

4. The composition of claim 1, wherein the weight ratio of the first composition to the at least one oil is from 0.80 to 1.20.

5. The composition of claim 1, wherein the ethylene/α-olefin/non-conjugated diene interpolymer B has a Mw from 350,000 g/mole to 500,000 g/mole; and wherein component A has a Mw from 150,000 g/mole to 320,000 g/mole.

6. The composition of claim 1, wherein component A further comprises a second ethylene/alpha-olefin/non-conjugated diene interpolymer, and wherein the second ethylene/alpha-olefin/non-conjugated diene interpolymer differs from the ethylene/alpha-olefin/non-conjugated diene interpolymer A in one or more of the following properties, $Mw_{conv}$, $Mn_{conv}$, $MWD_{conv}$, MV (ML1+4, 125° C.), wt % diene (based on the weight of the interpolymer), and/or wt % ethylene (based on the weight of the interpolymer).

7. The composition of claim 6, wherein component A comprises ≥95 wt % of the ethylene/alpha-olefin/non-conjugated diene interpolymer A and the second ethylene/alpha-olefin/non-conjugated diene interpolymer, based on the weight of component A.

8. An article comprising at least one component formed from the composition of claim 1.

9. A composition comprising at least one oil and a first composition, wherein the first composition comprises:
   component A) comprising an ethylene/α-olefin/non-conjugated diene interpolymer A,
   component B) comprising an ethylene/α-olefin/non-conjugated diene interpolymer B; and
   wherein the weight ratio of component A to component B is from 1/1 to 20/1;
   wherein the weight average molecular weight (Mw) of the ethylene/α-olefin/non-conjugated diene B is greater than the weight average molecular weight (Mw) of component A; wherein the composition has a Mooney Viscosity (ML1+4, 100° C.) from 20 to 100; and
   wherein the first composition meets the following Equation B:

$$[(Mz_{(first\ comp.)}/(TD0.1_{(first\ comp.)})]/(Mw/Mn)_{(first\ comp.)} \geq 100{,}000\ g/mol \quad \text{(Eqn. B)},$$

wherein $TD0.1_{(first\ comp.)}$ is the tan delta of the first composition at 0.1 rad/sec and 190° C.

10. The composition of claim 9, wherein the first composition comprises ≥95 wt % of components A and B, based on the weight of the first composition.

11. The composition of claim 9, wherein the composition comprises ≥95 wt % of the oil and the first composition, based on the weight of the composition.

12. The composition of claim 9, wherein the weight ratio of the first composition to the at least one oil is from 0.80 to 1.20.

13. The composition of claim 9, wherein the ethylene/α-olefin/non-conjugated diene interpolymer B has a Mw from 350,000 g/mole to 500,000 g/mole; and wherein component A has a Mw from 150,000 g/mole to 320,000 g/mole.

14. The composition of claim 9, wherein component A further comprises a second ethylene/alpha-olefin/non-conjugated diene interpolymer, and wherein the second ethylene/alpha-olefin/non-conjugated diene interpolymer differs from the ethylene/alpha-olefin/non-conjugated diene interpolymer A in one or more of the following properties, $Mw_{conv}$, $Mn_{conv}$, $MWD_{conv}$, MV (ML1+4, 125° C.), wt % diene (based on the weight of the interpolymer), and/or wt % ethylene (based on the weight of the interpolymer).

15. The composition of claim 14, wherein component A comprises ≥95 wt % of the ethylene/alpha-olefin/non-conjugated diene interpolymer A and the second ethylene/alpha-olefin/non-conjugated diene interpolymer, based on the weight of component A.

16. An article comprising at least one component formed from the composition of claim 9.

* * * * *